Dec. 26, 1961  R. L. SHALLENBERG  3,014,473
AIR FUEL RATIO CONTROL FOR INTERNAL COMBUSTION ENGINES
Filed March 11, 1957
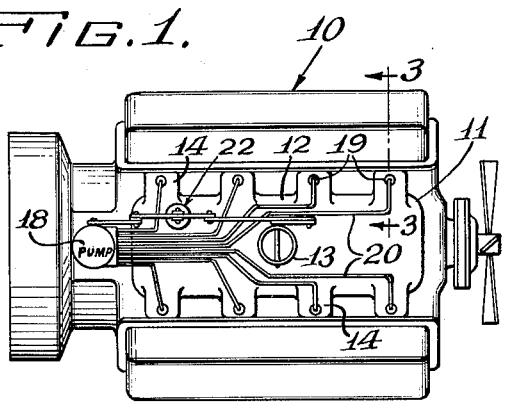
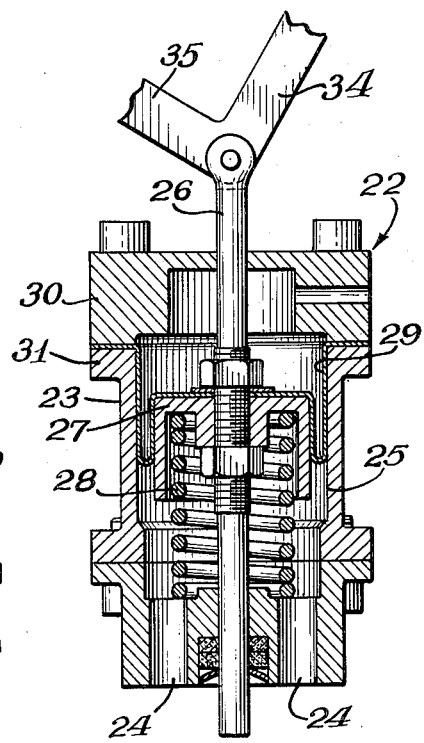
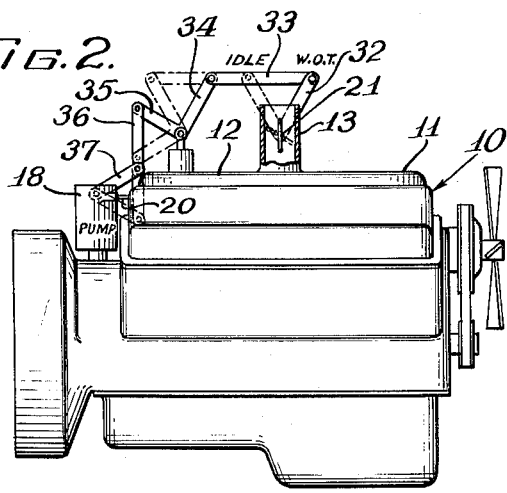
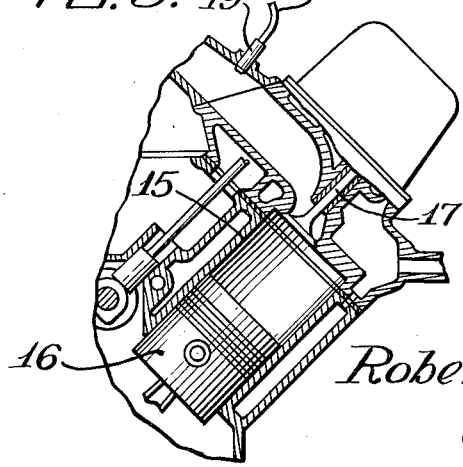
Inventor:
Robert L. Shallenberg
Atty.

United States Patent Office 3,014,473
Patented Dec. 26, 1961

3,014,473
AIR FUEL RATIO CONTROL FOR INTERNAL COMBUSTION ENGINES
Robert L. Shallenberg, Wheaton, Ill., assignor to International Harvester Company, Chicago, Ill., a corporation of New Jersey
Filed Mar. 11, 1957, Ser. No. 645,109
2 Claims. (Cl. 123—119)

This invention relates to internal combustion engines and is primarily concerned with apparatus for keeping the air fuel ratio constant on fuel injection spark ignition engines.

An object of the invention is to get a quick change in fuel with change in air with movement of the air throttle so that the air fuel ratio is kept constant.

Another object of the invention is to provide a means of keeping the air fuel ratio constant when there is a change in air without movement of the air throttle due to a change in load on the engine.

The foregoing and other objects of the invention will be apparent from the construction and arrangement illustrated in the accompanying drawings wherein:

FIGURE 1 is a top plan view of an internal combustion engine showing the air fuel ratio control, FIGURE 2 is a side elevational view of an internal combustion engine showing the air fuel ratio control, FIGURE 3 is a sectional view through one of the cylinders of the engine, and FIGURE 4 is a view of the pressure response device partly broken away to show the interior of the device.

The invention proposes a means of supplying fuel and air to a fuel injection type internal combustion engine so as to keep the air fuel ratio constant. An air throttle is provided in the intake manifold and is connected by linkage to a pressure responsive device in the intake manifold between the air throttle and the engine cylinders. The air throttle and the pressure responsive device are also connected by linkage to the fuel injection pump. Movement of the air throttle from one position to another changes the pressure in the intake manifold and this change in pressure actuates the pressure responsive device which affects the linkage and movement of the air throttle also affects the linkage so that the resultant linkage movement moves internal mechanism in the fuel injection pump so that the fuel delivery by the injection pump to the cylinders is changed resulting in a constant air fuel ratio. When the air throttle is at a certain position a change of load on the engine will change the pressure in the intake manifold and this pressure change actuates the pressure responsive device so that the delivery of fuel by the injection pump to the engine cylinders is changed so that the air fuel ratio is kept constant.

In the drawings, 10 generally designates an internal combustion engine of the spark ignition type. The internal combustion engine 10 has an intake passage in the form of a manifold 11 including a large housing 12 and an inlet pipe 13 in communication with the housing and in communication with the atmosphere and a plurality of branch pipes 14 in communication with the housing. The engine 10 has eight cylinders 15 and a piston 16 is disposed in each cylinder and one of the branch pipes 14 of the intake manifold is in communication with one of the cylinders. Each of the cylinders 15 has the usual intake valve 17 connected to a camshaft which is connected to the engine crankshaft. A fuel injection pump 18 is provided and is driven by the engine. Such a fuel injection pump forms the subject matter of my patent application titled "Liquid Fuel Pumping and Metering Distributor with Rotating Pumping and Distributing Plunger," Serial No. 554,239, now Patent No. 2,839,999. A fuel injection nozzle 19 is provided for each cylinder 15 and is mounted in the respective branch pipe 14 of the intake manifold. A tube 20 leads from the fuel injection pump 18 to the fuel injection nozzle 19 for each cylinder so that fuel is delivered from the pump to the nozzle. An air throttle 21 in the form of a circular plate is pivotally mounted in the inlet pipe 13 of the intake manifold and is connected to a pedal moved by the foot of the engine operator. A pressure responsive device 22 is mounted on the large housing 12 of the intake manifold. The pressure responsive device 22 is in the form of a diaphragm including a housing 23 and a pair of opposed openings 24 extending inwardly from one end of the housing and communicating with a passage 25 which extends to a location adjacent the other end thereof and then projecting out through one side of the housing in communication with the atmosphere. The pressure responsive device 22 further includes a plunger 26 slidably mounted in the housing 23 and projecting from the upper end of the housing and a cap 27 fixedly secured on the plunger and a coil spring 28 disposed on the plunger and engaging the housing and the cap and urging the cap upwardly. A rubber diaphragm 29 is clamped between two parts 30 and 31 of the housing and seats on the cap and extends downwardly between the cap and the housing. An arm 32 has one end fixedly secured to the rod on the air throttle exteriorly of the inlet pipe 13 and a link 33 has one end pivotally connected to the other end of the arm 32 and one arm 34 of a bell crank 34, 35 is pivotally connected to the other end of the link 33. The bell crank 34, 35 is pivotally mounted on the upper end of the plunger 26, and the other arm, 35, of such bell crank is pivotally connected with a link 36 which is pivotally connected at its lower end with an arm 37 of the fuel injection pump 18 that occupies pivotal positions according to the fuel quantity to be delivered by the pump.

The mode of operation of the invention is as follows:

In FIGURE 2 the plate on the air throttle 21 is in a vertical position and the arm 32 is labeled "W.O.T." which means "wide open throttle" position of the air throttle. The solid line positions of the parts 33, 34, 35, 36 and 37 are their position for wide open throttle. In the broken-line position of parts in FIGURE 2 the plate on the air throttle 21 is almost in a horizontal engine-idle position wherefore the position of the link 32 thus illustrated is designated "Idle." The air throttle may be moved from idle to wide open throttle position and also may be moved to an infinite number of intermediate positions between idle and wide open throttle. In the wide open position of the air throttle the fuel injection pump 18 is delivering the maximum amount of fuel to the fuel injection nozzles 19 and in the idle position the fuel injection pump is delivering the minimum amount of fuel to the fuel injection nozzles. When the air throttle 21 is moved from idle position to wide open throttle the pressure in the intake manifold 11 will be increased and this will cause the cap 27 to be moved upwardly with the aid of spring 28 and hence the plunger 26 will be moved upwardly resulting in the pump control arm 37 being swung upwardly which will increase the amount of fuel delivered by the fuel injection pump 18 to the fuel injection nozzles 19. When the air throttle is moved from wide open throttle to idle position the pressure in the intake manifold 11 will be decreased and this will cause cap 27 to be moved downwardly against the force of the spring resulting in plunger 26 being moved downwardly which will cause arm 37 to be moved downwardly to decrease the amount of fuel delivered by the fuel injection pump 18 to the fuel injection nozzles. Since some change in rate of air flow per revolutions will occur without motion of the air throttle, due to engine speed changes, the linkage must be compensated to change the fuel delivery accordingly. When the air throttle 21 is at a certain position an increase of load on the engine will decrease its speed and thus cause the pressure in the housing 12 to be increased causing the plunger 26 to be moved upwardly and pivoting arm 37 upwardly to increase the amount of fuel delivered by the fuel injection pump to the fuel injection nozzles. Where the air throttle 21 is at a certain position a decrease of load on the engine will cause its speed to increase and thus cause the pressure in the housing 12 to be decreased causing the plunger 26 to be moved downwardly and pivoting link 37 downwardly to decrease the amount of fuel delivered by the fuel injection pump to the fuel injection nozzles. A change in the position of the air throttle 21 will change the rate of air flow to the engine cylinders and this change of the throttle also moves arm 37 to change the fuel delivery by the fuel injection pump to the fuel injection nozzles. Thus the air fuel ratio is kept constant. When the air throttle 21 is at a certain position and the load on the engine changes its speed the rate of air flow to the engine cylinders will be changed and this change in air flow will actuate the pressure responsive device 22 to move the arm 37 so as to change the fuel delivery from the fuel injection pump to the fuel injection nozzles so that the air fuel ratio is kept constant.

What is claimed is:

1. Apparatus for regulating the ratio of fuel and air to an internal combustion engine having a cylinder and a piston in the cylinder and an intake passage in communication with the cylinder and the atmosphere and an injection nozzle in the intake passage adjacent the cylinder and a fuel injection pump in communication with the injection nozzle, the apparatus comprising an air throttle pivotally mounted in the intake passage, a pressure responsive device mounted in the intake passage between the air throttle and the cylinder and responsive to change of pressure in the intake passage, a first arm fixedly secured to the air throttle, a first link pivotally secured to the first arm, a second arm pivotally secured to the first link, a third arm fixedly secured to the second arm and pivotally connected to the pressure responsive device, a second link pivotally connected to the third arm, and a fourth arm pivotally connected to the second link and to the fuel injection pump.

2. Apparatus for regulating the ratio of fuel and air to an internal combustion engine having a cylinder and a piston in the cylinder and an intake passage in communication with the cylinder and the atmosphere and an injection nozzle in the intake passage adjacent the cylinder and a fuel injection pump in communication with the injection nozzle, the apparatus comprising an air throttle pivotally mounted in the intake passage, a pressure responsive device mounted in the intake passage between the air throttle and the cylinder and responsive to change of pressure in the intake passage, a first arm having one end fixedly secured to the air throttle, a first link having one end pivotally connected to the other end of the first arm, a second arm having one end pivotally connected to the other end of the first link and having its other end pivotally connected to the pressure responsive device, a third arm having one end pivotally connected to the pressure responsive device and fixedly secured to said other end of the second arm, a second link having one end pivotally connected to the other end of the third arm, and a fourth arm having one end pivotally connected to the other end of the second link and having its other end pivotally connected to the fuel injection pump.

References Cited in the file of this patent

UNITED STATES PATENTS

| | | |
|---|---|---|
| 2,136,959 | Winfield | Nov. 15, 1938 |
| 2,502,679 | Stanly | Apr. 4, 1950 |
| 2,813,522 | White et al. | Nov. 19, 1957 |
| 2,841,129 | Reggio | July 1, 1958 |